US012418102B2

(12) United States Patent
Inafune et al.

(10) Patent No.: US 12,418,102 B2
(45) Date of Patent: Sep. 16, 2025

(54) METAL PLATE ANTENNA AND ANTENNA DEVICE

(71) Applicant: KABUSHIKI KAISHA TOKAI RIKA DENKI SEISAKUSHO, Aichi (JP)

(72) Inventors: Koji Inafune, Aichi (JP); Kenichi Koga, Aichi (JP); Tatsuya Koike, Aichi (JP); Satoshi Mori, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 156 days.

(21) Appl. No.: 18/242,601

(22) Filed: Sep. 6, 2023

(65) Prior Publication Data

US 2024/0120646 A1 Apr. 11, 2024

(30) Foreign Application Priority Data

Oct. 5, 2022 (JP) ................................ 2022-160864

(51) Int. Cl.
*H01Q 1/36* (2006.01)
*H01Q 1/48* (2006.01)

(52) U.S. Cl.
CPC ................ *H01Q 1/36* (2013.01); *H01Q 1/48* (2013.01)

(58) Field of Classification Search
CPC .................................. H01Q 1/36; H01Q 1/48
See application file for complete search history.

(56) References Cited

U.S. PATENT DOCUMENTS 9,350,077 B1 * 5/2016 Zheng .................... H01Q 5/357

FOREIGN PATENT DOCUMENTS

JP 2012-235258 11/2012
JP 2012235258 A * 11/2012 ............ H01Q 1/243
JP 2022-133165 9/2022

* cited by examiner

*Primary Examiner* — Henry Luong
(74) *Attorney, Agent, or Firm* — Greenblum & Bernstein, P.L.C.

(57) ABSTRACT

There is provided a metal plate antenna transmitting and receiving wireless signals conforming to a prescribed communication standard, wherein an antenna width is designed to satisfy radiation resistance achieving a prescribed standing wave ratio in a resonant mode in which a loop length of the metal plate antenna is 1.5 wavelength of a wireless signal conforming to the prescribed communication standard.

11 Claims, 10 Drawing Sheets

10

110A

METAL PLATE ANTENNA AND ANTENNA DEVICE

CROSS REFERENCE TO RELATED APPLICATION(S)

This application is based upon and claims benefit of priority from Japanese Patent Application No. 2022-160864, filed on Oct. 5, 2022, the entire contents of which are incorporated herein by reference.

BACKGROUND

The present invention relates to a metal plate antenna and an antenna device.

In recent years, a wide variety of antennas have been developed. For example, Japanese Patent Application Laid-open No. 2022-133165 discloses a loop antenna disposed on a substrate.

SUMMARY

However, the adaptable bandwidth of frequencies is generally narrow in the loop antenna.

In view of the above-described problem, the present invention aims at providing an antenna adaptable to a wider band.

To solve the above described problem, according to an aspect of the present invention, there is provided a metal plate antenna transmitting and receiving wireless signals conforming to a prescribed communication standard, wherein an antenna width is designed to satisfy radiation resistance achieving a prescribed standing wave ratio in a resonant mode in which a loop length of the metal plate antenna is 1.5 wavelength of a wireless signal conforming to the prescribed communication standard.

To solve the above described problem, according to another aspect of the present invention, there is provided an antenna device, comprising: a substrate; and a metal plate antenna that is arranged on the substrate and configured to transmit and receive a wireless signal conforming to a prescribed communication standard, wherein the metal plate antenna has an antenna width designed to satisfy radiation resistance achieving a prescribed standing wave ratio in a resonant mode in which a loop length of the metal plate antenna is 1.5 wavelength of a wireless signal conforming to the prescribed communication standard.

In the above-described present invention, it is possible to provide an antenna adaptable to a wider band.

DETAILED DESCRIPTION OF THE EMBODIMENT(S)

Figure 1:
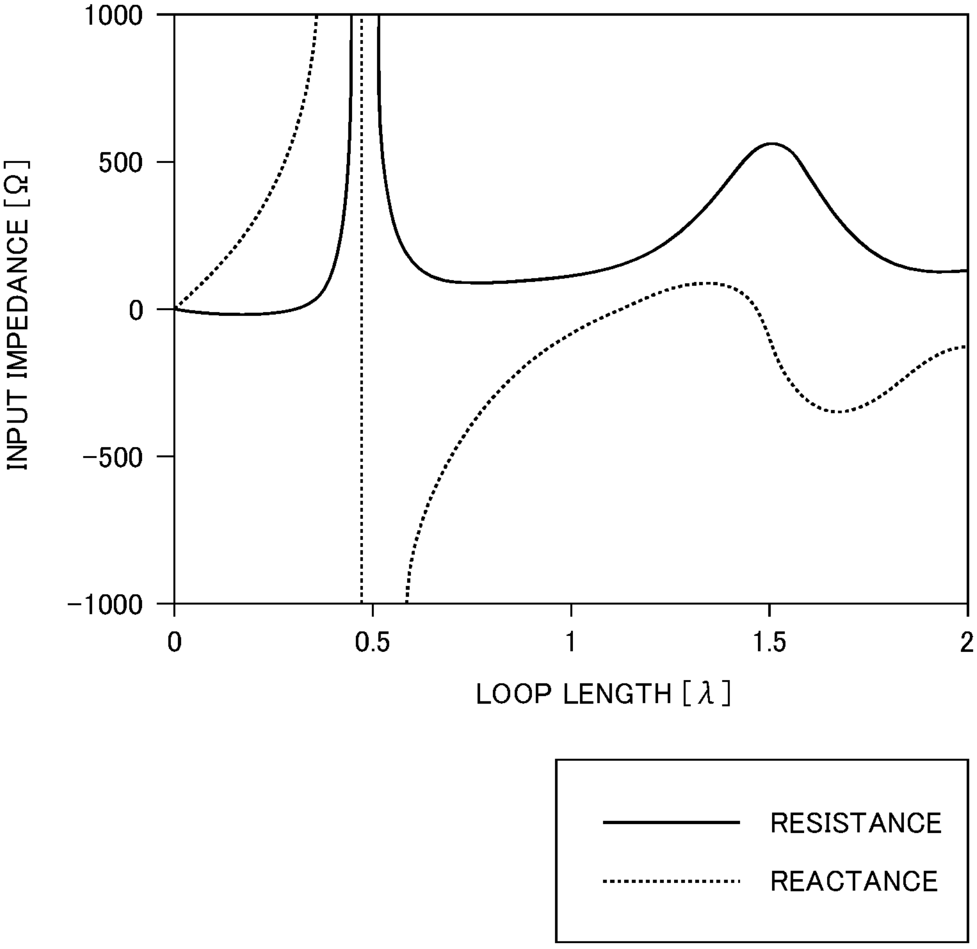
FIG. 1 is a diagram illustrating the relation among input impedance, resistance (radiation resistance), and reactance in a loop antenna.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Moreover, in this specification and drawings, different alphabets may be added after the same reference sign to distinguish a plurality of components of the same kind from each other. However, when it is not necessary to distinguish a plurality of components of the same kind from each other, the above-described alphabet may be omitted and the explanation will be given in common to all of the components of the same kind.

1. Embodiment

The first metal plate antenna 110A (see FIG. 5) and the second metal plate antenna 110B (see FIG. 7) according to an embodiment of the present invention transmit and receive wireless signals conforming to a prescribed communication standard. In the following description, the first metal plate antenna 110A and the second metal plate antenna 110B may be collectively referred to as the metal plate antenna 110.

An example of the above-described prescribed communication standard is ultra-wide band (UWB) wireless communication.

In ultra-wide band wireless communication, a plurality of channels having mutually different frequency bands are defined. In addition, some countries or regions may use a plurality of channels such as CH5 (center frequency: 6489.6 MHz) and CH9 (center frequency: 7987.2).

However, the adaptable bandwidth of a general loop antenna is narrow. Thus, it may be difficult to be adaptable to a communication standard in which a plurality of channels may be used such as ultra-wide band wireless communication.

FIG. 1 is a diagram illustrating the relation among input impedance, resistance (radiation resistance), and reactance in a general loop antenna.

FIG. 1 illustrates the input impedance [Ω] on the vertical axis, and the loop length [λ] of the loop antenna on the horizontal axis. The λ represents a wavelength of a wireless signal.

As illustrated in FIG. 1, in a general linear loop antenna, when the loop length is around 1λ, the resistance corresponding to the real part of the input impedance is about 100Ω, and the reactance corresponding to the imaginary part of the input impedance is around 0.

Therefore, a general loop antenna easily takes impedance matching for a transmission line with a characteristic impedance of 50Ω in a resonant mode in which the loop length is 1λ.

Meanwhile, as illustrated in FIG. 1, in a general linear loop antenna, when the loop length is around 1.5λ, the resistance is about 500Ω, and the reactance is around 0.

In this manner, in a general loop antenna, the resistance is excessively large in a resonant mode in which the loop length is 1.5λ. Thus, it is difficult to take impedance matching for a transmission line with a characteristic impedance of 50Ω.

Figure 2:
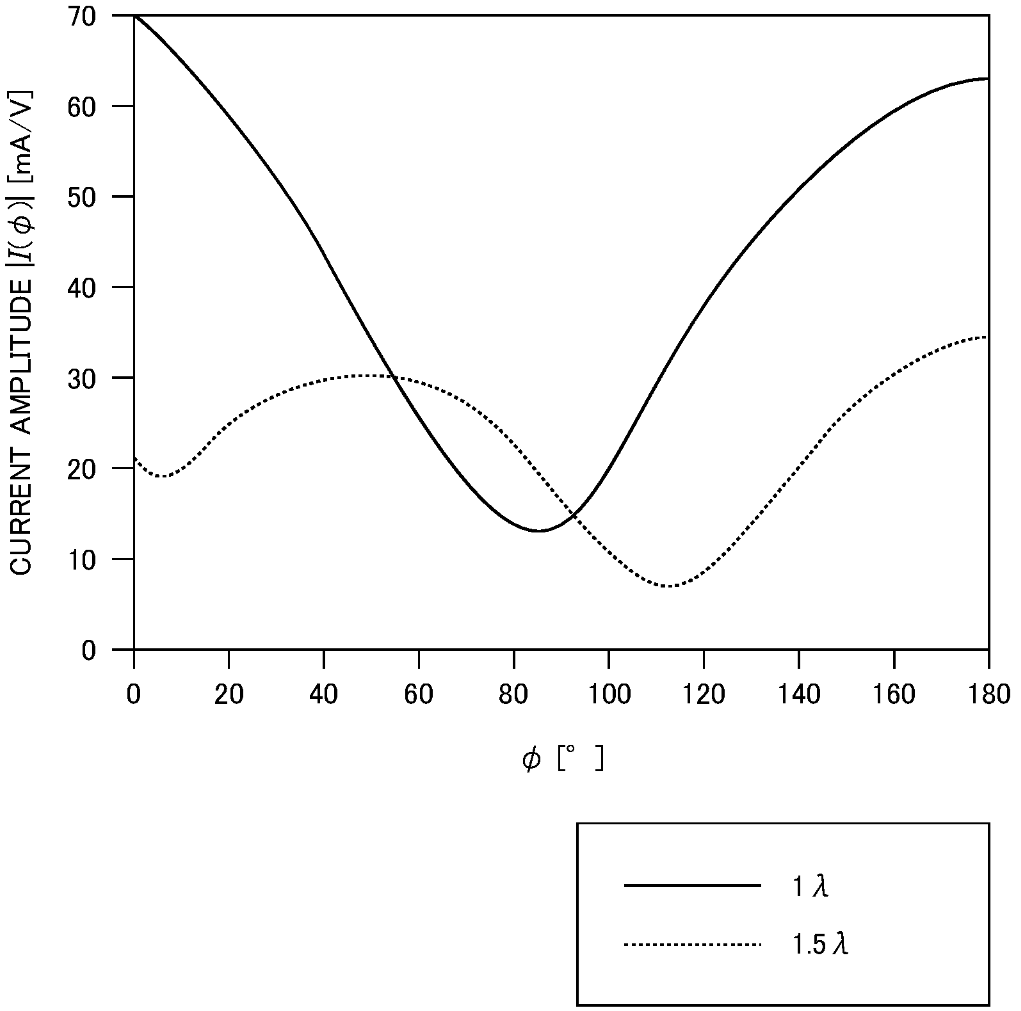
FIG. 2 is a diagram illustrating the current distribution related to a standing wave of a loop antenna.
Figure 3:
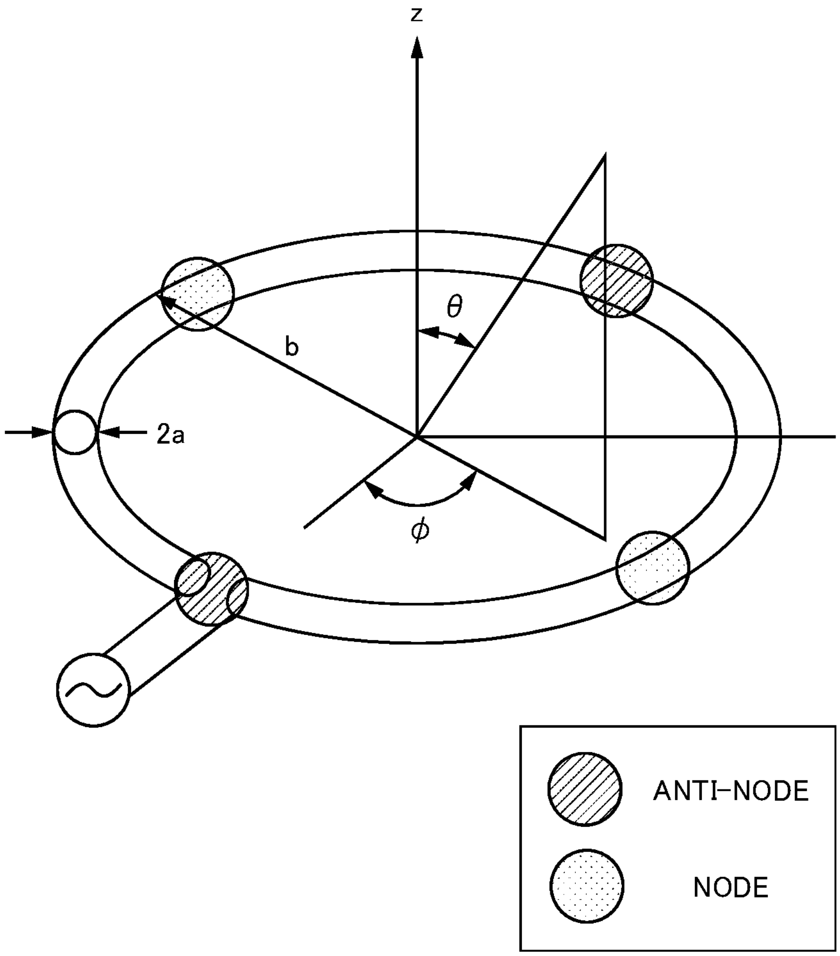
FIG. 3 is a diagram illustrating a standing wave around 1λ in a loop antenna.
Figure 4:
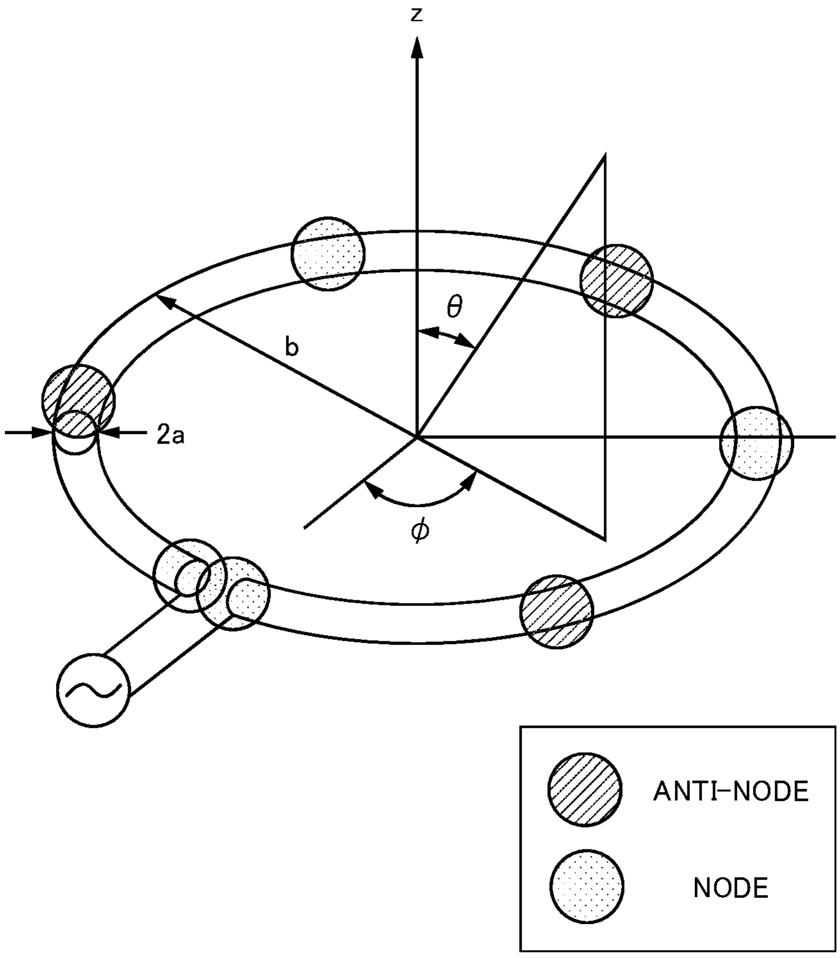
FIG. 4 is a diagram illustrating a standing wave around 1.5λ in a loop antenna.

However, the current distribution related to the standing wave of a loop antenna can be represented as illustrated in FIG. 2, and the standing wave around 1λ, and the standing wave around 1.5λ can be represented as illustrated in FIGS. 3 and 4, respectively.

Therefore, if the reduction of resistance is possible by any method, the loop antenna can be used in two resonant modes of loop length=1λ and loop length=1.5λ, thereby achieving a wider band.

The metal plate antenna 110 and the antenna device 10 according to an embodiment of the present invention are made in view of the above-described aspects, and are capable of reducing radiation resistance (resistance) and achieving a prescribed standing wave ratio.

An example of the method for reducing resistance according to the embodiment is an increase in antenna width.

Figure 5:
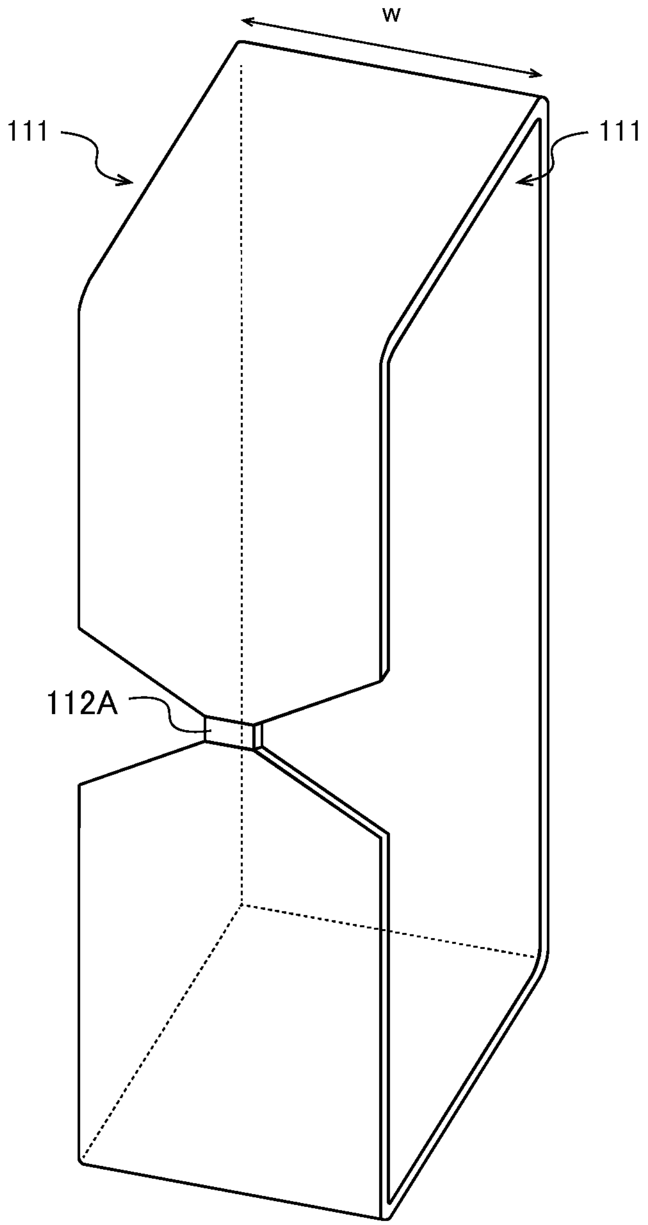
FIG. 5 is a diagram illustrating an example of the shape of a first metal plate antenna 110A according to an embodiment of the invention.

FIG. 5 is a diagram illustrating an example of the shape of the first metal plate antenna 110A according to the embodiment.

The first metal plate antenna 110A of the embodiment may be a loop antenna formed using a single metal plate. In a case where an RF input/output pin of the IC is adapted to a differential signal, the connection to 112A is performed through a balanced line. In a case where the RF input/output pin of the IC is not adapted to a differential signal, the connection to 112A is performed after conversion into a differential signal using a balun.

The loop length of the first metal plate antenna 110A of the embodiment may be designed to about 1λ for the first frequency and about 1.5λ for the second frequency.

An example of the above-described first frequency is a center frequency of CH5 in ultra-wide band wireless communication.

An example of the above-described second frequency is a center frequency of CH9 in ultra-wide band wireless communication.

Further, the embodiment is characterized in that the antenna width w of the first metal plate antenna 110A is designed to satisfy radiation resistance achieving a prescribed standing wave ratio in a resonant mode in which the loop length is 1.5 wavelength of a wireless signal conforming to a prescribed communication standard.

For example, the antenna width w of the first metal plate antenna 110A of the embodiment may be designed to satisfy radiation resistance achieving a prescribed standing wave ratio in a resonant mode in which the loop length is 1.5 wavelength of the second frequency.

Note that the antenna width of the embodiment may be defined as the length between two open parts 111 formed facing each other in the loop structure.

Figure 6:
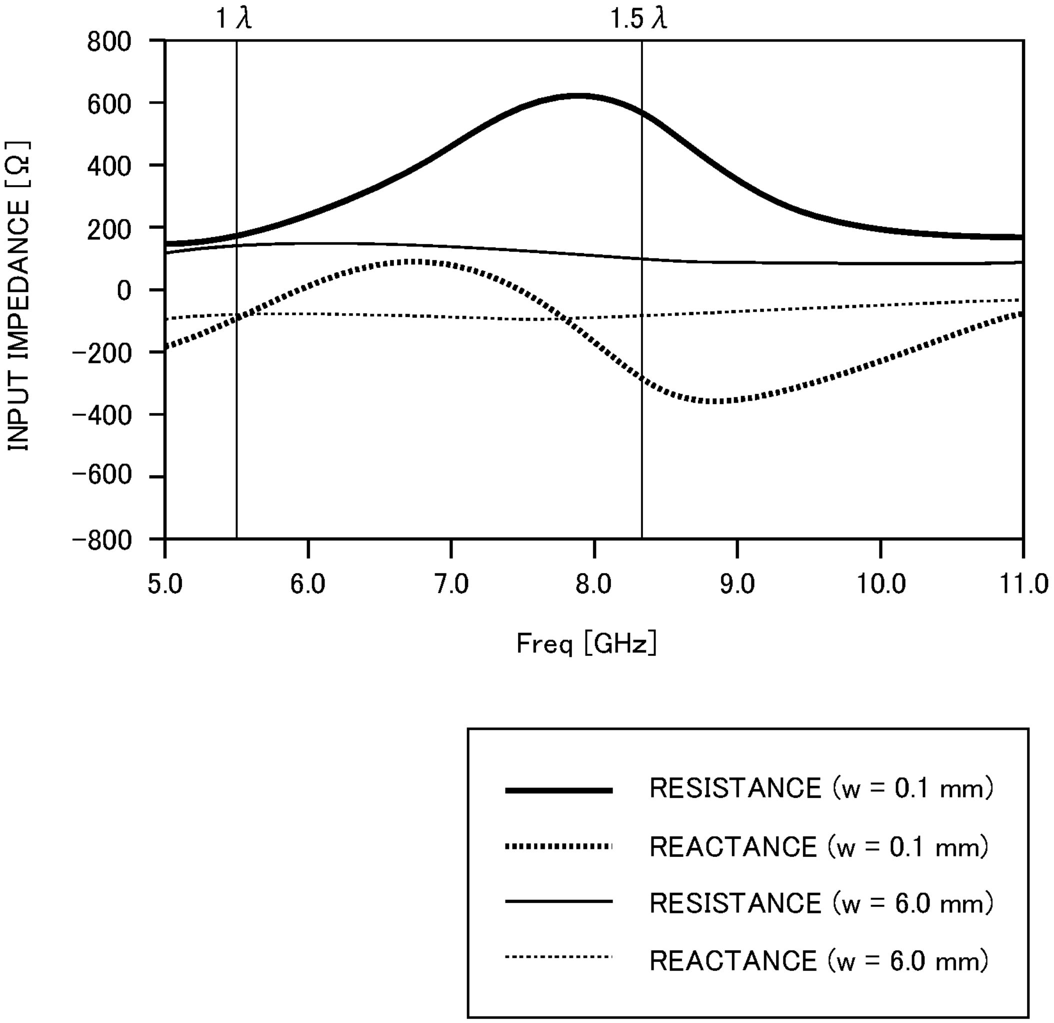
FIG. 6 is a diagram illustrating the relation between the antenna width w and input impedance of the first metal plate antenna 110A according to the embodiment.

FIG. 6 is a diagram illustrating the relation between the antenna width w and input impedance of the first metal plate antenna 110A according to the embodiment.

FIG. 6 illustrates the resistance and reactance when the antenna width w of the first metal plate antenna 110A is designed to 0.1 mm, and the resistance and reactance when the antenna width w of the first metal plate antenna 110A is designed to 6.0 mm.

As illustrated in FIG. 6, when the antenna width w is 6.0 mm, the resistance and reactance are significantly reduced due to the Q value reduced around 1.5λ, as compared with the case where the antenna width w is 0.1 mm.

Therefore, the antenna widths w of the first metal plate antenna 110A of the embodiment and the second metal plate antenna 110B described later may be determined so that a Q value around 1.5 wavelength of a wireless signal conforming to a prescribed communication standard is reduced. This makes it possible to satisfy the resistance achieving a prescribed standing wave ratio.

Moreover, an example of the method for reducing resistance according to the embodiment is a mirror image effect by the GND 130 (see FIG. 8) formed on the substrate 150.

Figure 7:
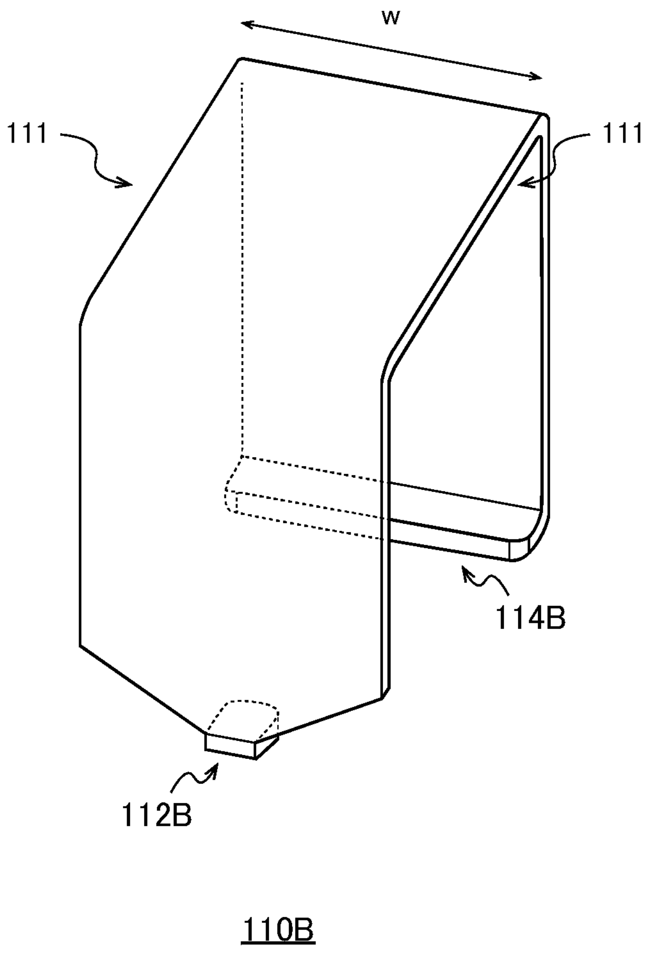
FIG. 7 is a diagram illustrating an example of the shape of a second metal plate antenna 110B according to the embodiment.
Figure 8:
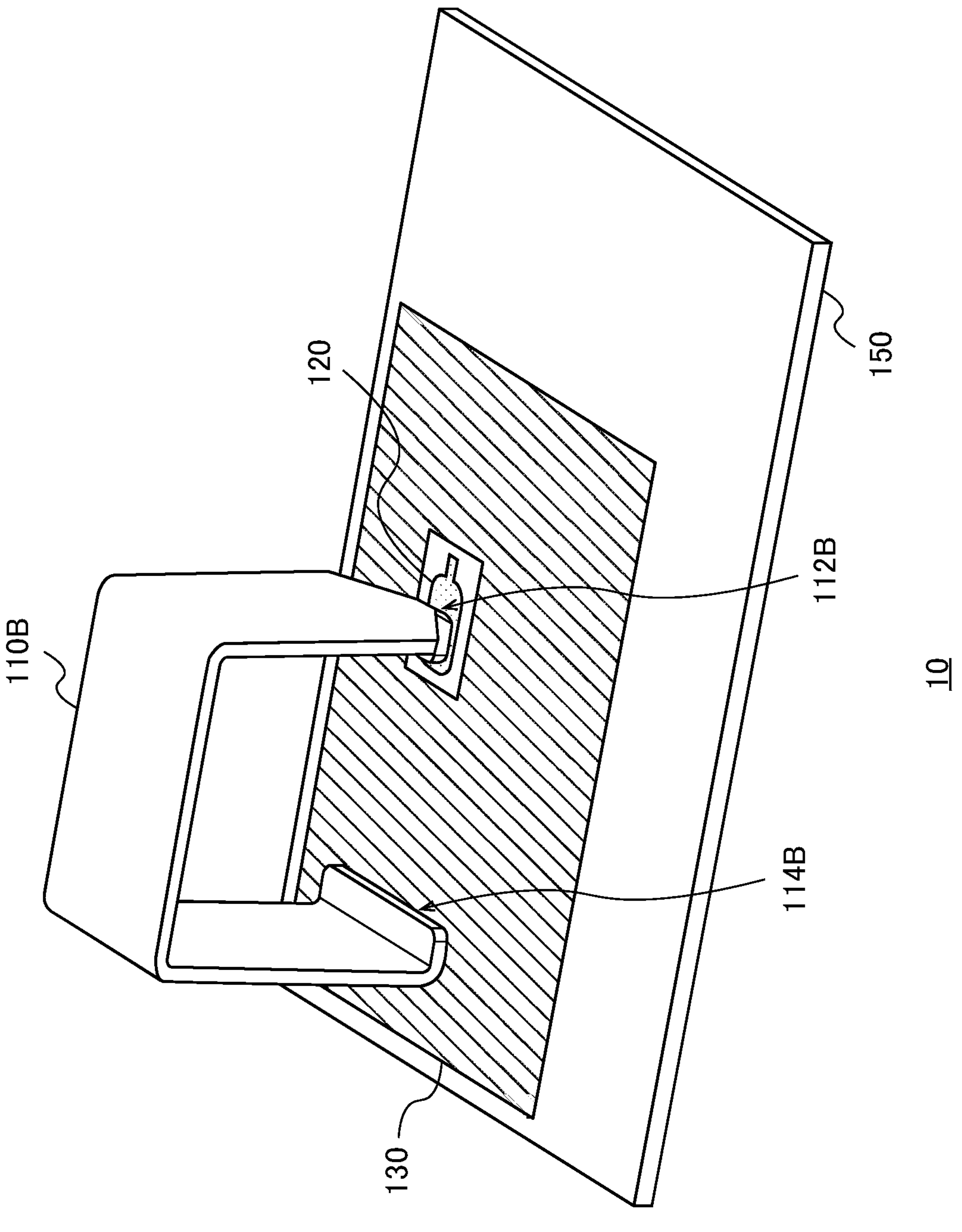
FIG. 8 is a diagram for explaining the positional relation among the second metal plate antenna 110B, a power feeding point 120, a GND 130, and a substrate 150 according to the embodiment.

FIG. 7 is a diagram illustrating an example of the shape of the second metal plate antenna 110B according to the embodiment. Moreover, FIG. 8 is a diagram for explaining the positional relation among the second metal plate antenna 110B, the power feeding point 120, the GND 130, and the substrate 150 according to the embodiment;

The antenna device 10 of the embodiment includes the substrate 150 where the power feeding point 120 and the GND 130 are disposed, and either the second metal plate antenna 110B or the first metal plate antenna 110A.

The second metal plate antenna 110B of the embodiment is formed of, for example, a single metal plate with an arch shape at least partially.

The second metal plate antenna 110B of the embodiment includes, at one end of the above-described arch shape, a power feeding point contact portion 112B in contact with the power feeding point 120 formed on the substrate 150.

Further, the second metal plate antenna 110B of the embodiment includes, at the end different from the above-described one end (the other end) of the arch shape, a GND contact portion 114B in contact with the GND 130 formed on the substrate 150.

The antenna length of the second metal plate antenna 110B defined by the length between the power feeding point contact portion 112B and the GND contact portion 114B may be designed to about ½λ for the first frequency and about ¾λ for the second frequency.

With the antenna lengths formed as described above, the second metal plate antenna 110B operates as a loop antenna with a loop length of 12λ for the first frequency and as a loop antenna with a loop length of 1.5λ for the second frequency, by a mirror image formed with the GND 130 as a mirror surface.

Figure 9:
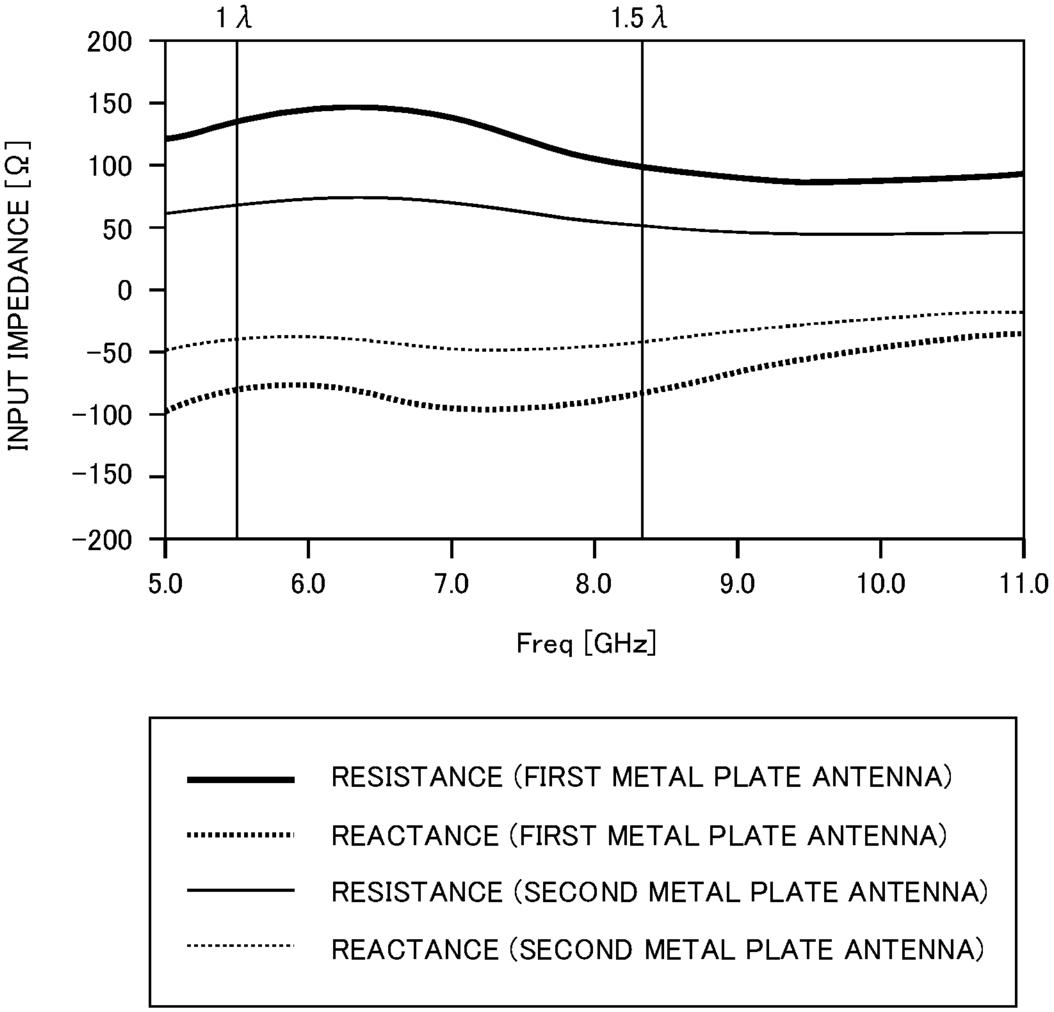
FIG. 9 is a diagram illustrating the comparison of input impedances related to the first metal plate antenna 110A and the second metal plate antenna 110B according to the embodiment.

FIG. 9 is a diagram illustrating the comparison of input impedances related to the first metal plate antenna 110A and the second metal plate antenna 110B according to the embodiment.

FIG. 9 illustrates the resistance and reactance of the first metal plate antenna 110A (antenna width=6.0 mm) and the resistance and reactance of the second metal plate antenna 110B (antenna width=6.0 mm).

As illustrated in FIG. 9, in the second metal plate antenna 110B, the resistance and reactance are reduced more significantly as compared with the first metal plate antenna 110A.

In this manner, with the second metal plate antenna 110B according to the embodiment, it is possible to satisfy the resistance achieving a prescribed standing wave ratio by the mirror image effect of the GND 130.

Further, with the second metal plate antenna 110B, it is possible to secure a bandwidth conforming to a prescribed communication standard by using the resonance mode in which the loop length formed by the mirror image effect is 1.5 wavelength of a wireless signal conforming to the prescribed communication standard and the resonance mode in which the loop length is 1 wavelength of a wireless signal conforming to the prescribed communication standard.

For example, in a case where the prescribed communication standard is ultra-wide band wireless communication and the first frequency is the center frequency of CH5 and the second frequency is the center frequency of CH9, the second metal plate antenna 110B can operate as a wide band antenna adaptable to CH5 and CH9.

The following will describe other components of the antenna device 10 according to the embodiment.

The antenna device 10 of the embodiment further includes the high-frequency IC 160 (see FIG. 10) connected to the power feeding point 120 by a transmission line, and a notch filter that attenuates signals in a prescribed frequency band. Further, whether the transmission line connecting the high-frequency IC 160 and the power feeding point 120 and the notch filter are connected may be switchable by the element 180.

Figure 10:
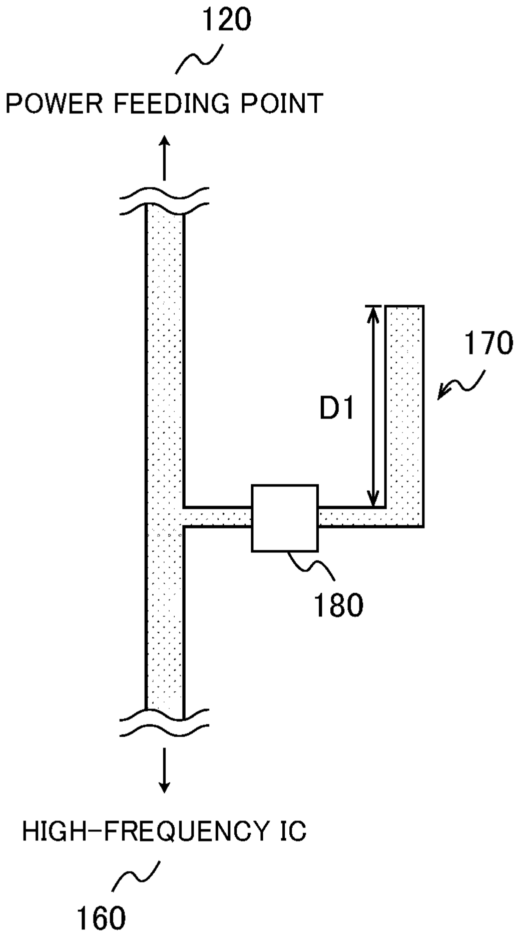
FIG. 10 is a diagram for explaining the positional relation among the power feeding point 120, a high-frequency IC 160, a notch filter, and an element 180.

FIG. 10 is a diagram for explaining the positional relation among the power feeding point 120, the high-frequency IC 160, the notch filter, and the element 180 according to the embodiment.

Note that FIG. 10 illustrates an example of the case where the notch filter is a stub 170.

The length D1 of the stub 170 is designed in accordance with the frequency to be attenuated.

For example, it is assumed that the prescribed communication standard is ultra-wide band wireless communication. In ultra-wide band wireless communication, a plurality of channels are defined, but the available channels may be restricted depending on countries and regions.

For example, if CH5 and CH9 are available in a country X, and only CH9 is available in a country Y, the antenna device 10 used in the country Y is required not to transmit and receive signals in CH5.

In view of the above-described circumstances, the antenna device 10 of the embodiment may be able to change frequency bands of wireless signals transmitted and received in the manufacturing process or after the manufacturing.

For example, in the case of the above-described example, the length D1 of the stub 170 is formed to be a length that attenuates signals in a frequency band where the spurious output of the high-frequency IC 160 exceeds an allowable value defined by Radio Law.

Further, whether the transmission line connecting the high-frequency IC 160 and the power feeding point 120 and the stub 170 are connected may be switchable by the presence and absence of a chip element. The chip element is an example of the element 180. When the element 180 has reactance, the frequency band for which signals are attenuated is affected. Thus, the element 180 having appropriate reactance is selected together with the length D1 of the stub 170.

In a case where the antenna device 10 includes a chip element, the chip element connects the transmission line connecting the high-frequency IC 160 and the power feeding point 120 and the stub 170. Thus, the stub 170 attenuates the signals in the frequency band corresponding to CH5, whereby CH5 becomes unavailable.

Meanwhile, in a case where the antenna device 10 does not include a chip element, the transmission line connecting the high-frequency IC 160 and the power feeding point 120 and the stub 170 are kept unconnected. Thus, the stub 170 does not attenuate the signals in the frequency band corresponding to CH5, whereby both CH5 and CH9 become available.

In this manner, the antenna device 10 according to the embodiment can easily change the available channel by switching the presence and absence of the chip element in the manufacturing process.

Meanwhile, the element 180 according to the embodiment may be a switching element.

In this case, the available channel can be changed by switching, using the switching element, whether or not the transmission line connecting the high-frequency IC 160 and the power feeding point 120 and the stub 170 are connected.

In this case, it is also possible to switch the available channel even after the product is shipped, which further enhances the versatility.

As described above, the antenna device 10 of the embodiment is characterized in that the available frequency band is changed by switching, using the element 180, whether or not the transmission line connecting the high-frequency IC 160 and the power feeding point 120 and the stub 170 are connected.

With the above-described features, it is possible to easily adapt to changes in destinations, and the like, and significantly reduce costs.

Note that the above has represented the case where the number of each of the notch filters and the elements 180 is one, but the number of the notch filters and the elements 180 is not limited to such an example.

The number of the notch filters and the elements 180 may be designed in accordance with the number of frequency bands to be use-restricted.

2. Supplement

Heretofore, preferred embodiments of the present invention have been described in detail with reference to the appended drawings, but the present invention is not limited thereto. It is obvious that a person skilled in the art can arrive at various alterations and modifications within the scope of the technical ideas defined in the claims, and it should be naturally understood that such alterations and modifications are also encompassed by the technical scope of the present invention.

For example, FIGS. 7 and 8 exemplify the case where the power feeding point contact portion 112B and the GND contact portion 114B of the second metal plate antenna 110B are both formed by bending the ends of the metal plate. Meanwhile, the shapes of the power feeding point contact portion 112B and the GND contact portion 114B are not limited to such examples. The power feeding point contact portion 112B and the GND contact portion 114B may have a pin shape inserted to a through hole formed on the substrate 150. Further, the power feeding point contact portion 112B and the GND contact portion 114B may have both the above-described pin shape and the bending shape formed by bending the end of the metal plate.

What is claimed is:

1. A metal plate antenna transmitting and receiving wireless signals conforming to a prescribed communication standard, wherein an antenna width is designed to satisfy radiation resistance achieving a prescribed standing wave ratio in a resonant mode in which a loop length of the metal plate antenna is 1.5 wavelength of a wireless signal conforming to the prescribed communication standard, the metal plate antenna has an arch shape, and includes, at one end of the arch shape, a power feeding point contact portion that is in contact with a power feeding point formed on a substrate, and a GND contact portion that is in contact with a GND formed on the substrate, at the other end of the arch shape, and radiation resistance achieving the prescribed standing wave ratio is satisfied by a mirror image effect of the GND.

2. The metal plate antenna according to claim 1, wherein a radiation resistance achieving the prescribed standing wave ratio is satisfied by determining the antenna width so that a Q value around 1.5 wavelength of the wireless signal conforming to the prescribed communication standard is reduced.

3. The meal plate antenna according to claim 1, wherein a bandwidth conforming to the prescribed communication standard is secured by using a resonance mode in which a loop length formed by the mirror image effect is 1.5 wavelength of a wireless signal conforming to the prescribed communication standard and a resonance mode in which the loop length is 1 wavelength of a wireless signal conforming to the prescribed communication standard.

4. The metal plate antenna according to claim 1, wherein the prescribed communication standard includes ultra-wide band wireless communication.

5. An antenna device, comprising:

a substrate; and a metal plate antenna that is arranged on the substrate and configured to transmit and receive a wireless signal conforming to a prescribed communication standard, wherein the metal plate antenna has an antenna width designed to satisfy radiation resistance achieving a prescribed standing wave ratio in a resonant mode in which a loop length of the metal plate antenna is 1.5 wavelength of a wireless signal conforming to the prescribed communication standard, the metal plate antenna has an arch shape, and includes, at one end of the arch shape, a power feeding point contact portion that is in contact with a power feeding point formed on the substrate, and a GND contact portion that is in contact with a GND formed on the substrate, at the other end of the arch shape, and radiation resistance achieving the prescribed standing wave ratio is satisfied by a mirror image effect of the GND.

6. The metal plate antenna according to claim 1, wherein the arch shaped metal plate antenna includes a flat surface portion that faces a surface of the GND provided to extend along a flat surface of the substrate.

7. The metal plate antenna according to claim 6, wherein the GND contact portion includes a flat plate portion extending from the other end of the arch shape in parallel to the surface of the GND, one surface of the flat plate portion of the GND contact portion is entirely in contact with the surface of the GND, and the other surface of the flat plate portion of the GND contact portion faces the flat surface portion of the arch shaped metal plate antenna.

8. The metal plate antenna according to claim 7, wherein a width of the flat plate portion of the GND contact portion is the same as the antenna width of the arch shaped metal plate antenna.

9. The metal plate antenna according to claim 6, wherein the power feeding point includes a flat portion provided to extend along the flat surface of the substrate, the power feeding point contact portion includes a flat plate portion extending from the one end of the arch shape in parallel to the flat portion of the power feeding point, one surface of the flat plate portion of the power feeding point contact portion is entirely in contact with the flat portion of the power feeding point, and the other surface of the flat plate portion of the power feeding point contact portion faces the flat surface portion of the arch shaped metal plate antenna.

10. The metal plate antenna according to claim 9, wherein a width of the flat plate portion of the power feeding point contact portion is smaller than the antenna width of the arch shaped metal plate antenna.

11. The metal plate antenna according to claim 1, wherein an antenna length of the arch shaped metal plate antenna defined by a length between the power feeding point contact portion and the GND contact portion is determined to be ½ wavelength for a center frequency of CH5 in ultra-wide band wireless communication and ¾ wavelength for a center frequency of CH5 in ultra-wide band wireless communication.

* * * * *